No. 11,917. Reissued July 2, 1901.
G. H. STEVENS.
PROCESS OF DUPLICATING PHONOGRAMS.
(Application filed Oct. 11, 1900.)
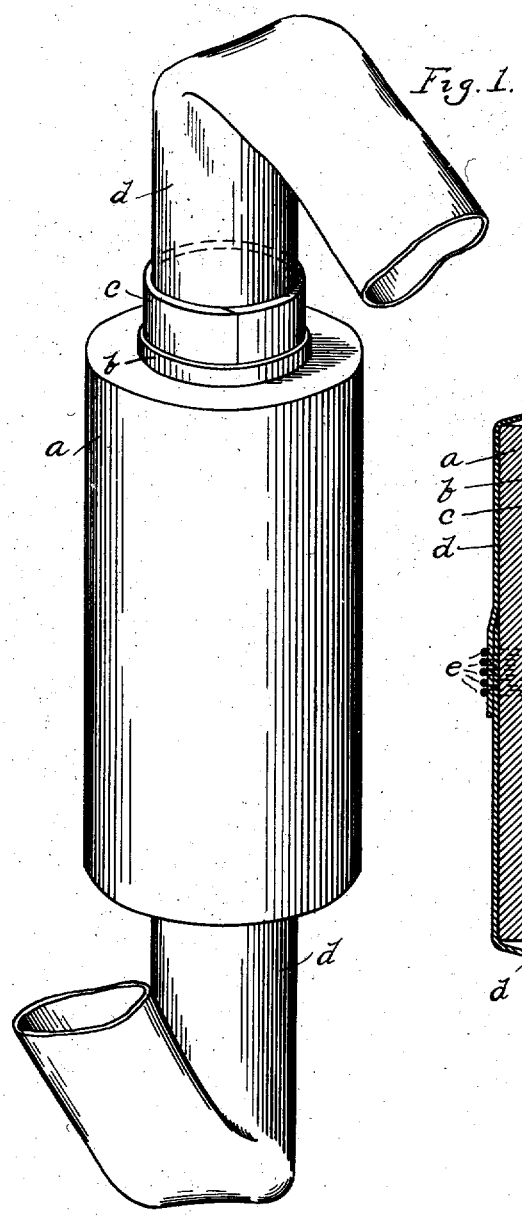
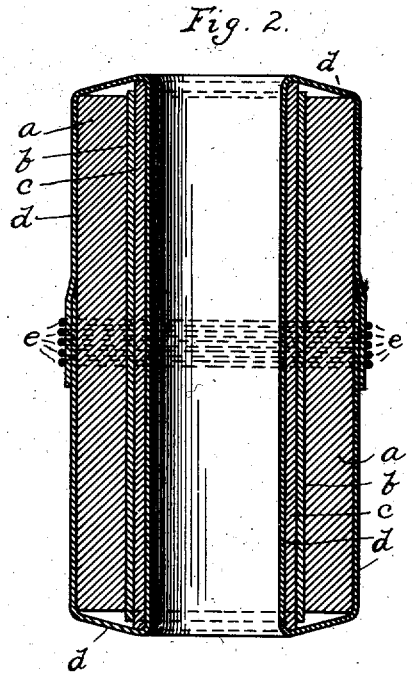
WITNESSES
Thos. E. Wisner
May E. Kott.
By
INVENTOR
George H. Stevens
Parker & Burton.
Attorneys.

UNITED STATES PATENT OFFICE.

GEORGE H. STEVENS, OF TOLEDO, OHIO.

PROCESS OF DUPLICATING PHONOGRAMS.

SPECIFICATION forming part of Reissued Letters Patent No. 11,917, dated July 2, 1901.

Original No. 650,431, dated May 29, 1900. Application for reissue filed October 11, 1900. Serial No. 32,738.

*To all whom it may concern:*

Be it known that I, GEORGE H. STEVENS, a citizen of the United States, residing at Toledo, Lucas county, Ohio, have invented a certain new and useful Process of Duplicating Phonograms, of which the following is a specification.

In the reproduction of cylindrical sound-records for phonographs and analogous machines the results have proved unsatisfactory owing to the soft and frail nature of the material employed. It is found that these records are easily scratched, defaced, marred, or broken, that they wear out quickly, and are not convenient for shipping unless extraordinary care is taken in packing them. To obviate these objections, I duplicate the record upon material that is so hard, tough, and flexible that it will take an impression only under hydrostatic or some other very high pressure. It is also found that the duplication of these cylinders is slow, laborious, and expensive and that their efficiency is diminished with each successive reproduction from the original. These difficulties and objections are due to the fact that heretofore no successful method has been devised for forming upon a seamless cylinder of hard tough resisting material a perfect cast or impression from a seamless mold or matrix containing the sound-record, because the withdrawal of such cast or impression from a seamless matrix would break down and destroy the delicate wave-lines of the sound-record either in the matrix or the reproduction, or both.

My invention relates to and one object is by the method or process hereinafter described to provide a seamless cylindrical duplicate of a cylindrical phonogram or sound-record, which record may be composed of hard tough resisting material, to prepare the same from a seamless matrix, and to make these reproductions in such manner that the matrix may be used over and over indefinitely without apparent deterioration.

The further object of my invention is to provide phonograms of the character described which shall be effective, cheap, light, durable, capable of being roughly handled without breaking or spoiling the same, and capable of being packed or nested in very small compass either by constructing the same in slightly-conical form or in cylinders of various diameters.

To this end the first step in my process consists in electrically depositing upon and around the usual cylindrical wax record an electrotype matrix or mold, first depositing a thin shell of nickel upon the wax and then depositing upon this a heavy shell of copper, the purpose of the nickel being to give to the interior face of the matrix a smooth surface that does not easily tarnish, that is harder than copper, and that will produce a higher polish upon the surface of the phonogram or record that is afterward pressed therein. Now from this matrix or mold the substance of which the original record is formed is entirely removed by melting or otherwise. The second step in my process is to introduce into the hollow of the matrix a thin closely-fitting cylinder of any hard tough resisting material having sufficient flexibility to allow it to bend without breaking. In practice I prefer celluloid. Sheet-celluloid may be readily obtained in the markets as thin as one one-hundredth of an inch and should be formed into thin flexible cylinders without joints or seams and of the proper diameter. If the finished and perfect cylinder-blanks cannot be readily obtained, they may be formed out of flat celluloid sheets cut of proper size to make a blank cylinder having a lapping joint of, say, one-eighth of an inch, more or less. The lapping surfaces when moistened with alcohol or ether will soften sufficiently to readily and firmly unite with each other when dry, and these edges when dried under pressure are smoothly and perfectly welded. Any unevenness or exposed edge may be readily dressed off in a lathe to a smooth and even surface, leaving the exterior surface of the cylinder without break or seam. Into this thin flexible cylinder is inserted a closely-fitting thin spring-brass cylinder longitudinally cut or split along one of its sides. When the edges of this piece are brought together, the outer surface is smooth and has the contour of the cylinder. When one of the edges is pressed inwardly out of line, the piece may be collapsed somewhat, so that it may readily be withdrawn from the cylinder. The celluloid blank, with its metal backing, is now slipped into the matrix or mold, which exactly fits the blank when in place. I provide the matrix and its contents with a flexible water-tight jacket or covering. This may be conveniently accomplished by drawing through the hollow of the inner brass cylinder a piece of soft-rubber tubing considerably longer than the matrix and then turning the ends of the tube backward upon the outside of the matrix, so that the ends of the soft-rubber tubes are turned inside out and overlap each other. The rubber envelop thus formed may be secured against leak by winding with wire the overlapping portions of the tube or by clamping the same with a suitable band. I next subject the matrix and its contents to hydrostatic pressure. To accomplish this, I prefer to use a hydraulic "gun," which consists of a chambered piece or pieces of suitable metal constructed of necessary strength and having its chamber connected with a hydraulic pump of the required power. The hydraulic gun is also provided with a steam-jacket properly connected for heating the gun and its contents. In the chamber of this gun liquid-pressure is always uniform in all directions, and great compression may be obtained upon anything that may be contained therein when the interior of the object to be compressed is properly protected from access of the liquid employed in the gun. The matrix (or several of them) and its contents, inclosed in the water-tight flexible envelop, are placed inside the hydraulic gun, which is suitably closed and filled with water or other liquid. The contents of the gun are now subjected to hydrostatic pressure, which acts equally in all directions upon the soft-rubber covering. Its effect, therefore, is to force the rubber against the spring-brass cylinder and the spring-brass cylinder against the celluloid blank, which in turn is compelled to expand slightly and is thus forced against the interior face of the matrix. There will now be embossed or molded or stamped on the surface of the celluloid the reverse impression of the matrix itself, thus producing an exact duplicate of the original wax record. Although the spring-brass backing may be omitted, better results are obtained from its use. The office of the spring-brass cylinder is to firmly apply the liquid-pressure to the celluloid blank with a less yielding face than would be the case if the pressure were applied directly to the rubber and celluloid. It will be seen that by reason of the liquid-pressure in the gun acting equally and uniformly in all directions, and as the external and internal pressure on the matrix are the same, the matrix is preserved from crushing, breaking, or distortion. To further assist the process of pressing, as soon as a light pressure of, say, two thousand pounds to the square inch has been applied steam is allowed to fill the steam-jacket until the gun and its contents are well heated. This causes the blank of celluloid or the like to become in consequence more plastic and yielding than when cool, and it will under this condition mold easier when the heavier pressure is later applied. As soon as the blank has become hot further pressure is applied to the gun by the hydraulic pump. The steam when properly manipulated through the jacket will then by expansion increase the pressure within the gun until the registering-dial will indicate, say, from fifteen thousand to fifty thousand pounds pressure per square inch. The former figure is generally sufficient for a fair effect; but the nearer the latter figure is approached the more satisfactory are the results. The time necessary for the entire operation of pressing occupies usually from one to two hours. When a proper pressure has been exerted for a sufficient time, the steam is turned off from the steam-jacket, which allows the contents of the gun to cool and contract somewhat, thus lowering the pressure. Now the pressure should be kept up by the pump until the gun and its contents have become cooled, for in embossing and pressing compositions under heat best results are obtained by allowing the material to become cool while yet under full pressure. Instead of employing a hydraulic gun in the pressing-process the matrix may be made very strong and provided with means for capping or sealing its ends hermetically, the whole being constructed to withstand a sufficient interior pressure without a corresponding exterior one. This matrix should be provided with a steam-jacket, and inside of the matrix should be a rubber bag attached to the hydraulic connection, so that when the liquid-pressure is applied moisture will be excluded from the interior of the matrix, the cylinder, and the cylindrical spring-brass backing. This device is, however, the obvious mechanical equivalent of the gun or any other means of obtaining interior hydrostatic pressure upon the cylinder. As only comparatively low pressures can be employed in the modification here suggested, the use of the gun above described is much to be preferred. When sufficiently cool, the chamber of the gun is opened and the matrix and its contents are taken out. The wire or band is now removed from the outside of the rubber, the rubber being stripped off readily, as its adhesion is but slight, and the spring-brass cylinder is collapsed and removed, as above indicated. The inner face of the matrix will be found to have a lining of celluloid or the like firmly and uniformly embedded upon its face, which lining is quite flexible. Now if a stiff blunt small steel wire or other suitable instrument is carefully inserted between the celluloid cylinder and the matrix itself the side of the flexible cylinder can be sprung inwardly, thus reducing the exterior circumference of the cylinder, which permits the cylinder to be readily detached and withdrawn from its matrix or mold without injury to either the mold or the phonogram. It will be seen that from a seamless matrix or mold has been constructed and embossed or stamped a seamless record of practically indestructible material, having on its surface an exact reverse impression of the matrix and having such a sharp distinct impression as will cause the usual needle and diaphragm of a talking-machine of the type in question to respond in exactly the same manner as do the original common wax records when new. The thin flexible phonogram, which may, if wished, be formed somewhat tapering, is now slipped onto a suitable hollow mandrel or holder properly constructed for the purpose and, if desired, may be securely fastened there by some adhesive substance, though preferably I employ a rigid hollow mandrel with a slightly-tapering exterior surface upon which the record may be crowded tightly, said mandrel having an interior face, also slightly tapering, but with a suitable diameter and taper to fit snugly over the usual mandrels with which the various types of talking-machines are usually supplied. The thin flexible record is now ready for use.

In the accompanying drawings, made part hereof, Figure 1 is an elevation of a matrix or mold, a blank and its backing of spring-brass, and a rubber tube in the course of being assembled to receive hydrostatic pressure; and Fig. 2 is a central sectional elevation of the same assembled ready for hydrostatic pressure.

In the drawings, *a* is the matrix or mold; *b*, the blank cylinder; *c*, the inner spring-cylinder or backing, and *d* the elastic tube to form the water-tight jacket.

In Fig. 2, *e* represents the wire or band with which the backwardly-turned overlapping ends of the tube *d* are bound and compressed to make a water-tight joint.

Having described my invention, what I claim, and desire to secure by Letters Patent, is—

1. The improvement in the process of forming a duplicate cylindrical phonogram of plastic material from an electrotype-matrix, which consists in introducing into the plastic cylinder an expansible backing of solid material, and then expanding said last-mentioned cylinder.

2. The improvement in the process of forming a duplicate cylindrical phonogram of plastic material from an electrotype-matrix, which consists in introducing into the plastic cylinder an expansible backing of solid material, then excluding moisture from the matrix and its contents, and then subjecting the backing of solid material to internal hydrostatic pressure.

3. The method or process of duplicating cylindrical phonograms which consists in forming a seamless electrotype matrix or mold from the phonogram to be duplicated, then introducing into said matrix a flexible blank cylinder of hard, tough material having a solid backing separable therefrom, then excluding moisture from the face of the matrix, the blank and its backing, and then applying hydrostatic pressure to the interior of the blank and its backing, substantially as described.

4. The method or process of duplicating cylindrical phonograms which consists in forming a seamless electrotype matrix or mold from the phonogram to be duplicated, then introducing into said matrix a hollow, blank cylinder having a separable solid backing, and then applying hydrostatic pressure to the interior of said backing, substantially as described.

5. The method or process of duplicating cylindrical phonograms which consists in forming an electrotype seamless matrix from the phonogram to be duplicated, then introducing into said matrix a blank of hard, tough, flexible substance having a separable solid backing, then applying hydrostatic pressure to the interior of the blank and its backing, and then separating the matrix, the phonogram thus produced, and its backing, substantially as described.

6. The method or process of duplicating cylindrical phonograms which consists, first, in forming an electrotype, seamless matrix or mold from the phonogram to be duplicated; second, introducing into said matrix a thin flexible blank cylinder having a suitable backing of solid material; third, excluding moisture from the face of the matrix and the blank; fourth, applying hydrostatic pressure to the interior of the blank and its backing, and, fifth, separating the matrix, the phonogram thus formed and its backing, substantially as described.

7. The method or process of duplicating a cylindrical phonogram which consists in forming a hollow cylindrical matrix or mold having the reverse record upon its interior surface, introducing into said matrix a hollow blank cylinder of a substance that may be molded by hydraulic pressure, excluding the access of water to the contiguous surfaces of said matrix and said blank, while permitting the access of the water to the interior of the inner cylinder, placing said matrix and blank into the chamber of a hydraulic gun, and increasing the hydraulic pressure in said chamber, and finally separating the newly-impressed record-cylinder from the matrix, substantially as described.

8. The method or process of duplicating a cylindrical phonogram which consists in forming a hollow cylindrical matrix or mold having the reverse record upon its interior surface, introducing into said matrix a hollow, blank cylinder of a material that may be molded by hydraulic pressure inclosing the walls of said matrix and blank in a flexible annular envelop impervious to water, concentric with said cylinders, placing said matrix and blank so inclosed into the chamber of a hydraulic gun, and increasing the pressure in said chamber, and finally separating the newly-impressed record-cylinder from the matrix, substantially as described.

9. The method or process of duplicating a cylindrical phonogram which consists in forming a cylindrical matrix or mold having the reverse record upon its interior surface, introducing into said matrix a blank cylinder of a material that may be molded by hydraulic pressure, passing a thin, flexible tube impervious to the fluid used, through said cylinders and doubling it back over the ends thereof until the ends of said tube overlap, placing said matrix and blank so inclosed into the chamber of a hydraulic gun, and increasing the pressure in said chamber, substantially as described.

10. The method or process of duplicating a cylindrical phonogram which consists in forming a cylindrical matrix or mold having the reverse record upon its interior surface, introducing into said matrix a blank cylinder of a material that may be molded by hydraulic pressure, passing a thin rubber tube through said cylinder and doubling it back over the ends thereof until the ends of said rubber tube overlap, placing said matrix and blank so inclosed into the chamber of a hydraulic gun and increasing the pressure in said chamber, substantially as described.

Signed at Detroit, county of Wayne, and State of Michigan, this 21st day of September, 1900.

GEORGE H. STEVENS.

Witnesses:
NETTIE V. BELLES,
ELLIOTT J. STODDARD.